United States Patent
Bhat

(10) Patent No.: US 8,924,544 B2
(45) Date of Patent: Dec. 30, 2014

(54) TECHNIQUES FOR SESSIONLESS REPORTING BY DEVICE MANAGEMENT CLIENT

(75) Inventor: Kong Posh Bhat, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 13/311,012

(22) Filed: Dec. 5, 2011

(65) Prior Publication Data

US 2012/0143987 A1 Jun. 7, 2012

Related U.S. Application Data

(60) Provisional application No. 61/420,682, filed on Dec. 7, 2010.

(51) Int. Cl.
  *G06F 15/173* (2006.01)
  *H04W 4/00* (2009.01)
  *H04L 12/64* (2006.01)
  *H04W 24/10* (2009.01)
  *H04L 29/06* (2006.01)

(52) U.S. Cl.
  CPC .............. *H04W 4/001* (2013.01); *H04W 4/005* (2013.01); *H04L 12/6418* (2013.01); *H04W 24/10* (2013.01); *H04L 29/06* (2013.01)
  USPC ........... 709/224; 709/217; 709/226; 709/227; 709/229; 726/3; 445/419; 445/418; 445/424; 445/425

(58) Field of Classification Search
  CPC ....... H04W 4/001; H04W 8/22; H04W 24/10; H04L 29/08072; H04L 29/06; H04L 41/22; H04L 41/0206; H04L 12/2602; H04L 43/00
  USPC ...................... 709/227, 226, 224, 229; 726/3; 445/419, 418, 424, 425
  See application file for complete search history.

(56) References Cited

U.S. PATENT DOCUMENTS

| | | | |
|---|---|---|---|
| 6,430,177 B1* | 8/2002 | Luzeski et al. | 370/356 |
| 7,809,366 B2* | 10/2010 | Rao et al. | 455/419 |
| 2002/0194342 A1* | 12/2002 | Lu et al. | 709/227 |
| 2012/0031608 A1* | 2/2012 | Lembcke et al. | 166/191 |
| 2013/0031608 A1* | 1/2013 | Alfano et al. | 726/3 |

OTHER PUBLICATIONS

Fielding et al., RFC 2616—Hypertext Transfer Protocol—HTTP/1.1, Jun. 1999, The Internet Society, p. 33.*
OMA Device Management Sessionless Message, Candidate Version 1.3, May 25, 2010, Open Mobile Alliance.*

* cited by examiner

*Primary Examiner* — Eleni Shiferaw
*Assistant Examiner* — Gregory M Elmore
(74) *Attorney, Agent, or Firm* — Jefferson IP Law, LLP

(57) ABSTRACT

A device and method for performing sessionless reporting are provided. The device includes a memory for storing code of a Device Management (DM) Client and a Sessionless Report Configuration Management Object (MO), the Sessionless Report Configuration MO including one or more nodes, a processor for executing the code of the DM Client stored in the memory, a communications unit for sending and receiving information for the DM Client, and the DM Client for sending one or more sessionless reports to a DM server, and, while awaiting acknowledgement of the one or more sessionless reports from the DM Server in a subsequent DM Session, for controlling sessionless reporting based on criteria specified in at least one node included in the Sessionless Report Configuration MO.

17 Claims, 8 Drawing Sheets

TECHNIQUES FOR SESSIONLESS REPORTING BY DEVICE MANAGEMENT CLIENT

CROSS-REFERENCE TO RELATED APPLICATION

This application claims the benefit under 35 U.S.C. §119(e) of a U.S. provisional patent application filed on Dec. 7, 2010 in the U.S. Patent and Trademark Office and assigned Ser. No. 61/420,682, the entire disclosure of which is hereby incorporated by reference.

BACKGROUND OF THE INVENTION

1. Field of the Invention

The present invention relates to Device Management (DM) in a communication system. More particularly, the present invention relates to techniques for sessionless reporting by a DM Client.

2. Description of the Related Art

With the growth in ubiquitous communications technologies and systems, devices are increasing in functionality and complexity. However, with the increase in the functionality and complexity of the devices, a need for the management of the devices has developed. To address that need, the Open Mobile Alliance (OMA) established a Device Management (DM) Working Group to specify protocols and mechanisms that achieve management of devices. The OMA-DM Working Group has developed the OMA-DM specification, which defines a two-way protocol between a DM Server and a DM Client associated with a device that is used for remote management of the device. Hereafter, a device associated with a DM Client may be referred to as an OMA-DM device. Historically, the devices have been wireless devices, but of late, OMA-DM has begun addressing the remote management needs of all types of devices. Examples of OMA-DM include the setting of initial configuration information in devices, the subsequent installation and update of persistent information in devices, the retrieval of management information from devices, and the processing of events and alarms generated by devices.

An instance of an interaction between a DM sever and a DM Client is referred to as a DM session and may be initiated by either the DM Client or the DM Server. The DM Client is typically embedded at the device and the DM Server manages the device by invoking one or more commands on the DM Client. The DM Client processes the one or more commands and communicates a response back to the DM Server. Communication between the DM Server and the DM Client is implemented via the exchange of Synchronization Markup Language (SyncML) messages. SyncML is based on Extensible Markup Language (XML). The structure of the SyncML messages is defined by the SyncML Document Type Definition (DTD), which is defined by the OMA.

An example of a communication system employing OMA-DM is described below with reference to FIG. 1.

FIG. 1 illustrates an exemplary communication system employing OMA-DM according to the related art.

Referring to FIG. 1, the exemplary communication system employing OMA-DM may include a wired network 100, a wireless network 102, a wired device 110, a wireless device 112, a DM Server 120, and a DM Authority 130. Each of the wired device 110 and the wireless device 112 has associated therewith a DM Client (not shown). In addition, the DM Authority 130 may be an Operations Support System (OSS).

In FIG. 1, solid lines represent physical connectivity and dotted lines represent logical connectivity.

The exemplary communication system employing OMA-DM illustrated in FIG. 1 is merely one of a number of possible implementations. For example, one of the wired network 100 and the wireless network 102 may be omitted. Alternatively, the wired network 100 and the wireless network 102 may be combined. Further, while the DM Server 120 and the DM Authority 130 are shown as connected to the wired network 100, one or both of the DM Server 120 and the DM Authority 130 may alternatively be connected to the wireless network 102.

To facilitate OMA-DM in the communication system illustrated in FIG. 1, a two-way protocol based on the OMA-DM specification is utilized between the DM Server 120 and the DM Client associated with wireless device 112, and between the DM Server 120 and the DM Client associated with the wired device 110. The DM Authority 130 may direct the DM operations of the DM Client associated with each of the wired device 110 and wireless device 112 via the DM Server 120. Only the interaction between the DM Server 120 and a DM Client associated with each of the wired device 110 and wireless device 112, is within the scope of the OMA-DM specification.

An example of a DM Server initiated DM session with a DM Client is described below with reference to FIG. 2.

FIG. 2 is a signal diagram for a DM Server initiated DM session with a DM Client in a communication system according to the related art.

Referring to FIG. 2, the DM Server initiated DM session between a DM Server 202 and a DM Client 204 includes two phases. The first phase is a setup phase 210 and the second phase is a management phase 220. The setup phase 210 includes an exchange of information for authentication and device information. The exchange of information in the setup phase 210 includes one instance of each of three packages, namely Package 0 (212), Package 1 (214), and Package 2 (216). Package 0 (212) is communicated from DM Server 202 to DM Client 204 and is referred to as a Notification Message. Package 1 (214) is communicated from DM Client 204 to DM Server 202. Package 1 (214) includes client initialization information and device information. The client initialization information includes client credentials. Package 2 (216) is sent from DM Server 202 to DM Client 204. Package 2 (216) includes server initialization information and an initial management operation. The server initialization information includes one or more server credentials.

The management phase 220 includes the exchange of one or more instances of two types of packages, namely Package 3 (222), and Package 4 (224). Package 3 (222) is communicated from DM Client 204 to DM Server 202. Package 3 (222) includes client response information to the management operation triggered by Package 2 (216). Package 4 (224) is communicated from DM Server 202 to DM Client 204. Package 4 (224) includes at least one of an additional management operation and one or more additional user interaction commands, if the DM session is continued beyond the Package 2 message 216. Additional cycles of a Package 3 message 222 and a Package 4 message 224 may be transmitted between the DM Server 202 and DM Client 204 until the DM session is terminated.

The OMA-DM protocol supports the notion of DM bootstrapping. DM bootstrapping is the process by which a DM Client transitions from an un-provisioned, empty state, to a state where it is able to initiate a DM session with an authorized DM Server. A DM Client that has already been bootstrapped can be further bootstrapped to enable the DM Client to initiate a DM session with a new DM Server. An example of the OMA-DM architecture is described below with reference to FIG. 3.

FIG. 3 illustrates an OMA-DM architecture according to the related art.

Referring to FIG. 3, the OMA-DM architecture includes a DM Server 340, a DM Client 310 and DM standard Management Objects (MOs) 320. The DM Client 310 and the DM standard MOs 320 are co-located in a device 300. The OMA-DM architecture may include additional structural elements. However, a description of additional structural elements of the OMA-DM architecture is omitted for conciseness.

The DM Server 340 and DM Client 310, which have been described above, communicate via interfaces DM-1 330 and DM-2 332. DM Client 310 communicates via interface DM-5 334 with the DM Standard MOs 320.

The DM protocol defines three standard Management Objects (MOs) 320 that all implementations of a DM Client 310 must support. These DM standard MOs 320 include DMAccount (DMAcc) MO 322, Device Information (DevInfo) MO 324 and Device Details (DevDetail) MO 326.

The DMAcc MO 322 is used to manage information pertaining to bootstrapped DM Server 340. There is a single instance of the DMAcc MO 322 for each bootstrapped DM Server 340. For each DM Server 340 that has been successfully bootstrapped for DM device 310, the corresponding DMAcc MO 322 maintains information on a DM Server IDentifier (ID), connectivity information, server address, server and client credentials, etc. The DevInfo MO 324 provides basic information about the device 300 associated with the DM Client 310. The basic information includes a device ID, a device manufacturer ID, a model ID, and language settings. The DevDetail MO 326 provides additional information about the device 300 associated with the DM Client 310. The additional information includes device type, Original Equipment Manufacturer (OEM), hardware version, firmware version, software version, an indication of whether the device 300 supports optional features (e.g., large-object handling capability), maximum depth of the management tree, maximum total length of any Uniform Resource ID (URI), and maximum total length of any URI segment.

The OMA-DM standard specifies that OMA-DM MOs be represented as a tree of named nodes. An example of an OMA DMAcc MO node tree according to the related art is provided in FIG. 4 as an example of an OMA-DM MO node tree.

FIG. 4 illustrates a DMAcc MO node tree according to the related art.

Referring to FIG. 4, a pictorial description of a tree of named nodes of a DMAcc MO of the related art is shown. The nodes depicted in FIG. 4 are outside the scope of the present disclosure and therefore a description of each node is omitted herein for conciseness. A description of each node depicted in FIG. 4 can be found in section 5.3.1 of version 1.2.1 of the OMA-DM Standardized Objects, the entire disclosure of which is hereby incorporated by reference.

Each node in a MO is the potential target for invoking a management operation from the DM Server. In order to perform some remote management action, the DM Server executes an operation on the corresponding node. Nodes are addressed using a URI. The URI of a node is the concatenation of the names of all the nodes from the root of the management tree, using '/' as the delimiter. For example, the URI of the "Name" node of the DMAcc MO shown in FIG. 4 is "Node:<x>/Name".

Recently the OMA has set up a Task Force dedicated to Machine-to-Machine (M2M) communication. The Task Force has observed that the current assumption about OMA-DM devices is that the OMA-DM devices have significant memory and processing power, and are connected to a fixed or wireless network. However, many of the OMA-DM devices currently being deployed in M2M solutions are microcontrollers with limited capabilities. For such microcontrollers, the OMA-DM of the related art is too heavy. To address this shortcoming, OMA-DM should be extended in terms of protocol, MOs, other network bearers, etc., to support restricted capability OMA-DM devices. Thus, there is a need for a new lightweight DM to support M2M capability-limited OMA-DM devices.

As described above, the OMA-DM Transaction Model of the related art is essentially a secure request/response protocol between a DM Server and a DM Client that runs within the context of a DM session. Once a DM session is established, the DM Server alternately sends commands to the DM Client and receives responses from the DM Client. The DM Client also informs the DM Sever about events that have occurred on the device, via unsolicited alerts. As described above, all the reporting from the DM Client to the DM Server is done within the context of a DM Session, in either Package 1 or Package 3. However, with OMA-DM version 1.3, the concept of Sessionless DM has been introduced. This allows a DM Server to send messages to previously bootstrapped DM Clients, outside the context of a DM session. The DM Client processes these messages but does not send back a response.

To extend OMA-DM to support M2M capability-limited OMA-DM devices, the Sessionless DM concept may be exploited. Accordingly, there is a need for a technique that exploits the Sessionless DM concept in order to support M2M capability-limited OMA-DM devices.

SUMMARY OF THE INVENTION

An aspect of the present invention is to address at least the above-mentioned problems and/or disadvantages and to provide at least the advantages described below. Accordingly, an aspect of the present invention is to provide techniques for sessionless reporting by a Device Management (DM) Client In accordance with an aspect of the present invention, a device for performing sessionless reporting is provided. The device includes a memory for storing code of a DM Client and a Sessionless Report Configuration Management Object (MO), the Sessionless Report Configuration MO including one or more nodes, a processor for executing the code of the DM Client stored in the memory, a communications unit for sending and receiving information for the DM Client, and the DM Client for sending one or more sessionless reports to a DM server, and, while awaiting acknowledgement of the one or more sessionless reports from the DM Server in a subsequent DM Session, for controlling sessionless reporting based on criteria specified in at least one node included in the Sessionless Report Configuration MO.

In accordance with another aspect of the present invention, a method for a DM Client to perform sessionless reporting is provided. The method includes sending one or more sessionless reports to a DM server, while awaiting acknowledgement of the one or more sessionless reports from the DM Server in a subsequent DM Session, controlling sessionless reporting based on criteria specified in at least one node included in a Sessionless Report Configuration MO.

In accordance with yet another aspect of the present invention, at least one non-transitory processor readable medium is provided for storing a computer program of instructions configured to be readable by at least one processor for instructing the at least one processor to execute a computer process for performing the method as recited above.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
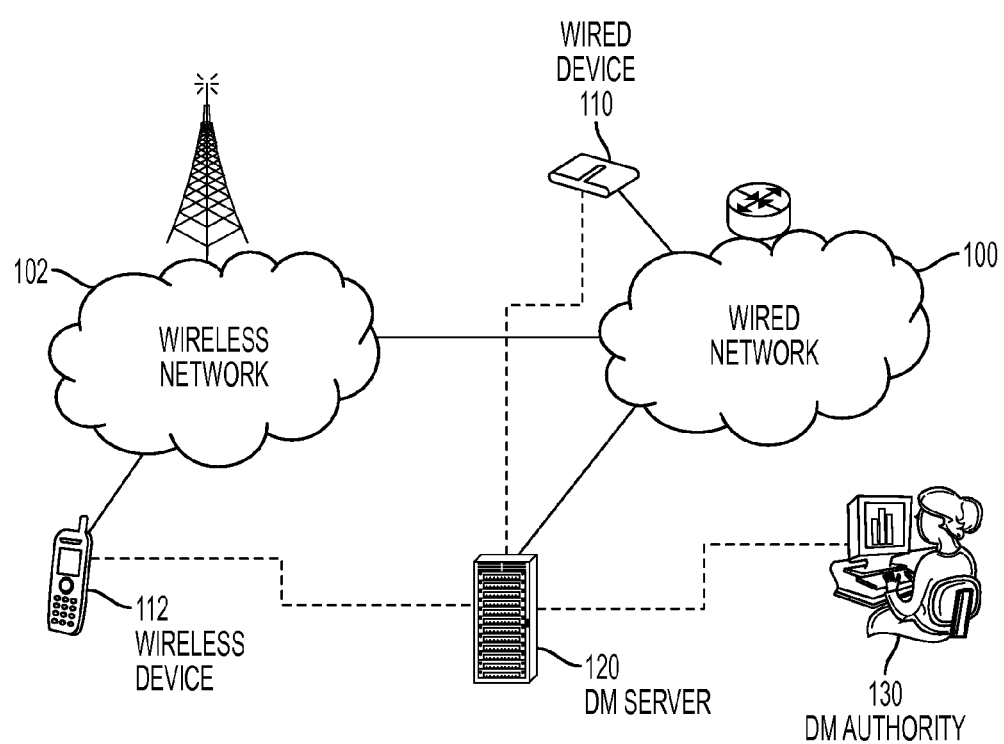
FIG. 1 illustrates an exemplary communication system employing Open Mobile Alliance (OMA)-Device Management (DM) according to the related art.
Figure 2:
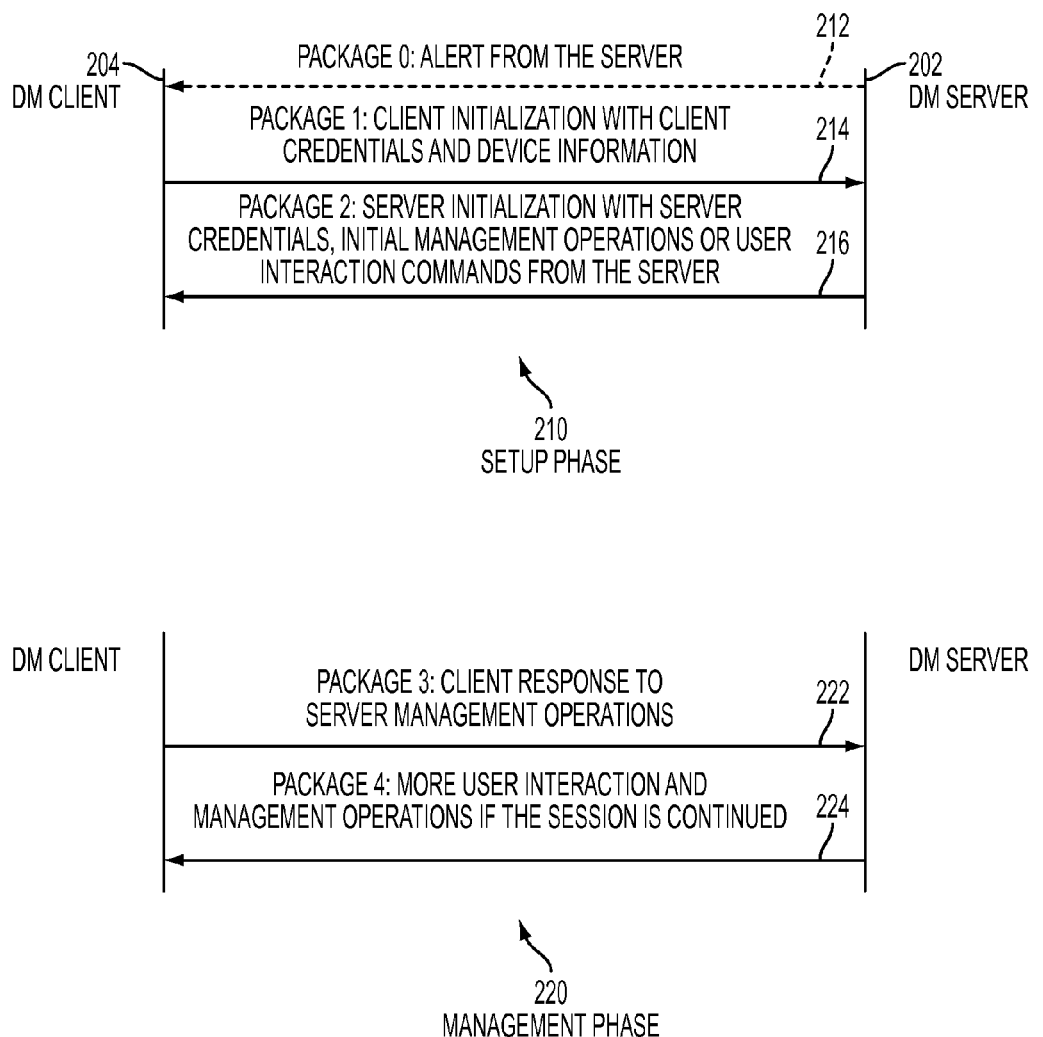
FIG. 2 is a signal diagram for a DM Server initiated DM session with a DM Client in a communication system according to the related art.
Figure 3:
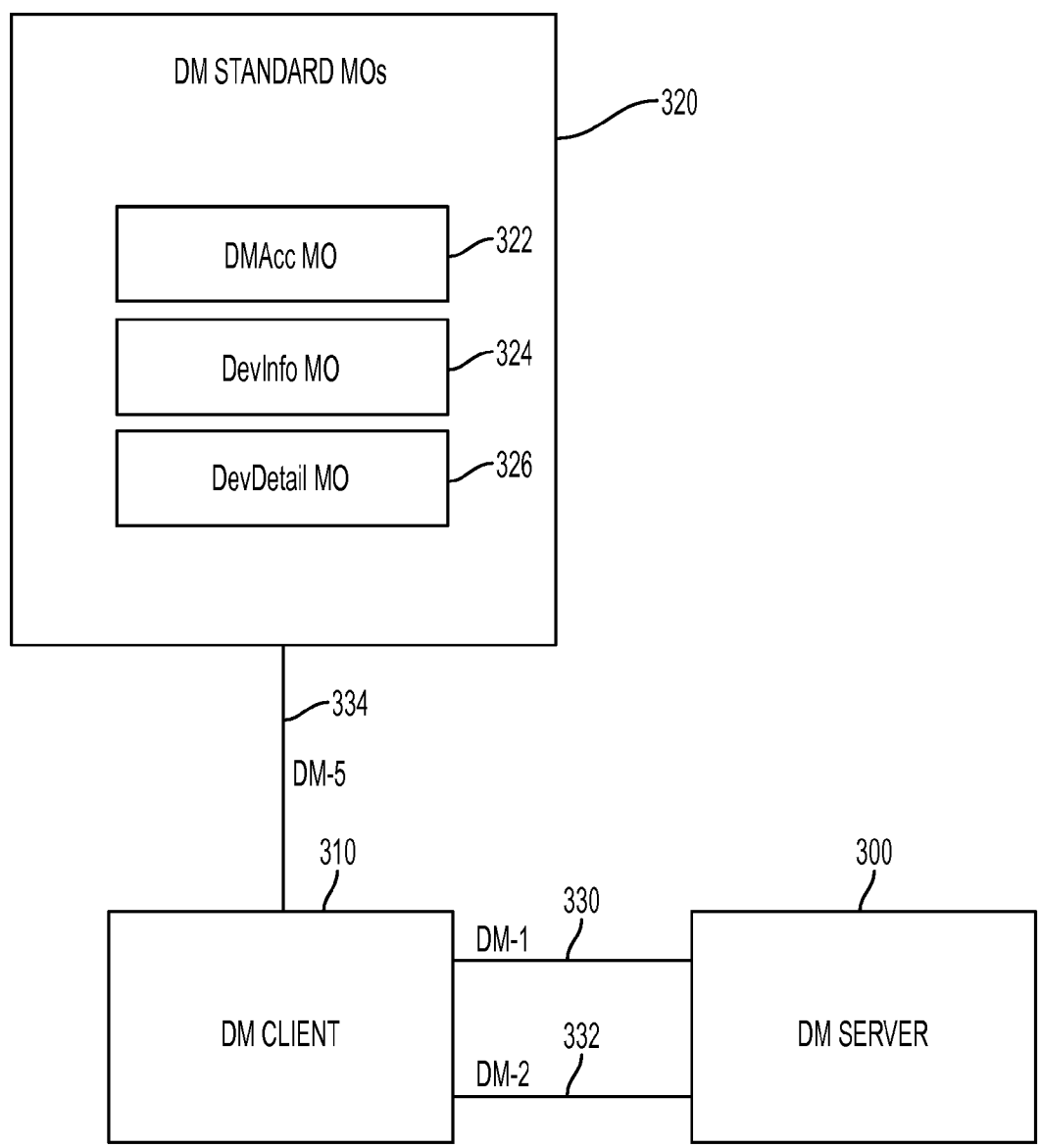
FIG. 3 illustrates an OMA-DM architecture according to the related art.
Figure 4:
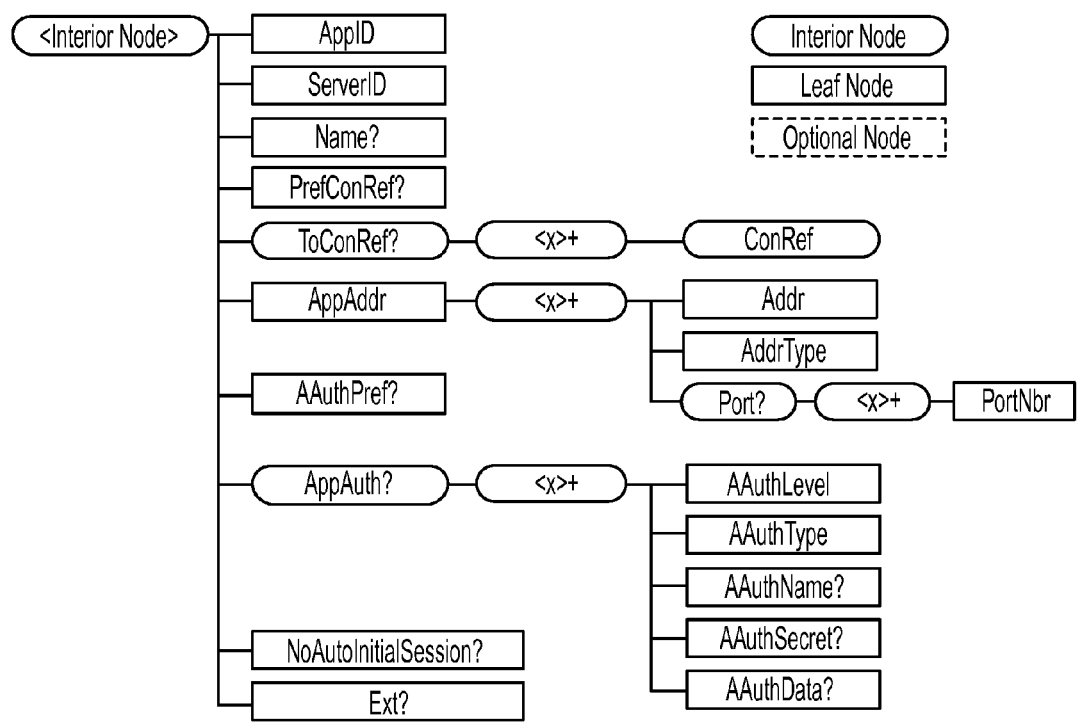
FIG. 4 illustrates DMAccount (DMAcc) Management Object (MO) node tree according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to sessionless reporting by a Device Management (DM) Client. More particularly, exemplary embodiments of the present invention described below relate to techniques for a lightweight reporting mechanism that can be employed by Open Mobile Alliance (OMA)-DM Clients running on resource constrained devices and that allow the DM Clients to send data (e.g., alerts, periodic measurement results, etc.) to a DM Server outside the context of a DM session. While the techniques for sessionless reporting by a DM Client may be described below in the context of OMA-DM, the present invention is not limited thereto and is similarly applicable to other DM.

It is noted that when the term "device" or "OMA-DM device" is referred to, each of the terms "device" and "OMA-DM device" may be inclusive of an associated DM Client running on the device. Further, it is noted that while exemplary embodiments of the present invention are described in the context of a single DM Server and a single device, any number of DM Servers and/or devices may be utilized.

It should be understood that the following description may refer to terms utilized in various standards merely for simplicity in explanation. For example, the following description may refer to terms utilized in one of the OMA standards, such as the OMA-DM standard. However, this description should not be interpreted as being limited to such standards. Independent of the mechanism used for sessionless reporting by a DM Client, it is advantageous for that ability to conform to a standardized mechanism.

OMA-DM Transaction Model

Described below are enhancements to OMA-DM transaction model in order to allow a DM Client to report data (e.g., periodic measurements, alerts, data associated with a previously issued command etc.) to a DM Server outside the context of a DM Session, according to exemplary embodiments of the present invention. Hereafter, this message may be referred to as a sessionless report message. The enhancements to the OMA-DM transaction model may be useful in addressing resource constrained Machine-to-Machine (M2M) devices because it may allow communication from the DM Client to the DM Server with minimal overhead.

An example of sessionless reporting by a DM Client is described below with reference to FIG. 5.

Figure 5:
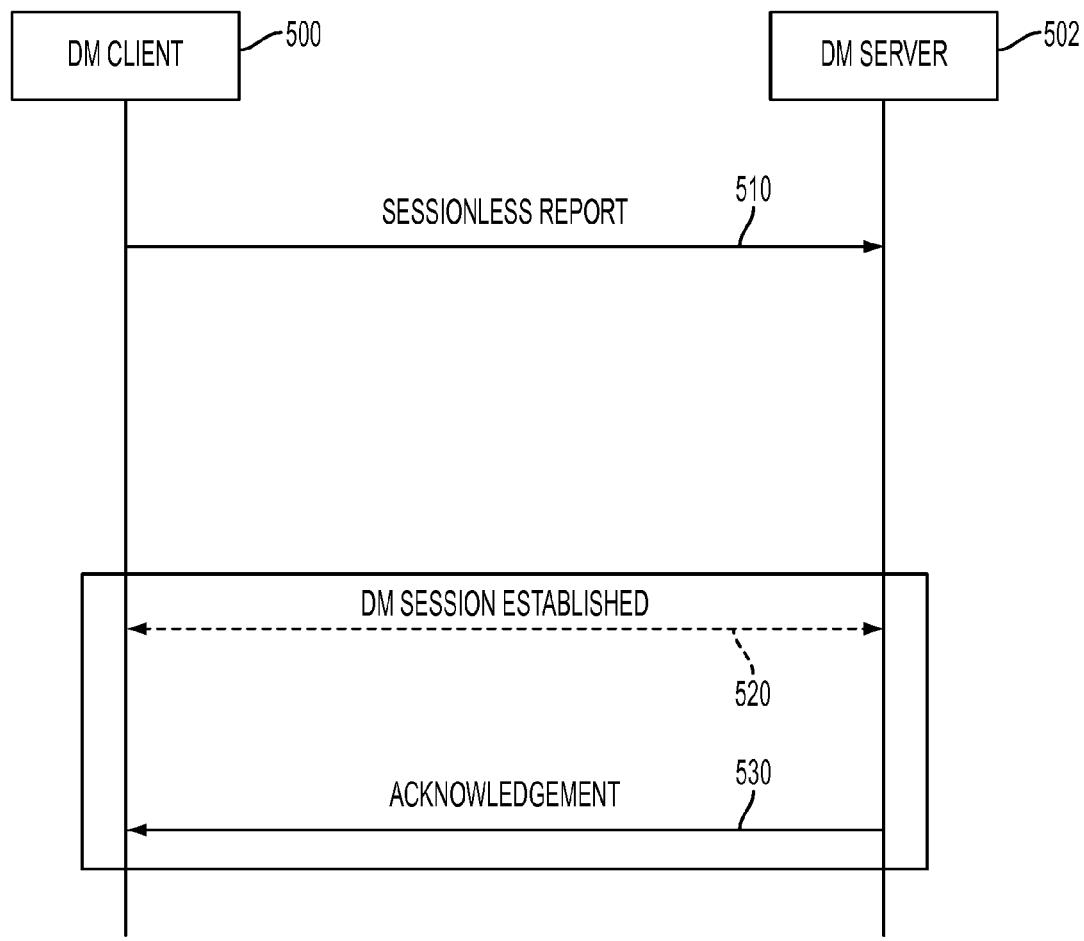
FIG. 5 illustrates an example of sessionless reporting by a DM Client according to an exemplary embodiment of the present invention.

FIG. 5 illustrates an example of sessionless reporting by a DM Client according to an exemplary embodiment of the present invention.

Referring to FIG. 5, a DM Client 500 communicates a sessionless report 510 to a DM server 502. The trigger that causes the DM Client 500 to issue and send the sessionless report 510 to the DM server 502 is outside the scope of the present disclosure and thus will not be discussed herein. The sessionless report 510 may be one of two types, namely a first type in which the DM Client 500 is not expecting an acknowledgement of the sessionless report 510 from the DM server 502, and a second type in which the DM Client 500 is expecting an acknowledgement 530 of the sessionless report 510 from the DM Server 502. With respect to the first type of sessionless report message 510, once the DM Client 500 communicates the sessionless report 510 to the DM Server 502, the DM Client 500 takes no further action.

With respect to the second type of sessionless report 510, after the DM Client 500 communicates the sessionless report 510 to the DM Server 502, the DM Client 500 awaits for receipt of an acknowledgement 530 of the sessionless report 510 from the DM Server 502 during a subsequent DM session 520. Herein, while one sessionless report 510 is described herein and illustrated in FIG. 5 for convenience in explanation, there may be more than one sessionless report 510 sent from the DM Client 500 to the DM Server 502.

The sessionless report 510 communicated from the DM Client 500 to the DM Server 502 may differ from a Package 1 and Package 3 message of the related art in one or more of the following six ways.

First, the sessionless report 510 may use a Session Alert Code other than 1200 (i.e., Server Initiated Management) and 1201 (i.e., Client Initiated Management). In one exemplary embodiment, the Session Alert Code value that is used is 1202. The value 1202 is reserved for future use in the related art.

Second, the sessionless report 510 may not contain Device Information (DevInfo) data.

Third, status blocks, if present in the sessionless report 510, may contain both a Session Identifier (ID) as well as a Command ID.

Fourth, the sessionless report 510 may contain a timestamp value, which indicates the time at which the sessionless report 510 was issued.

Fifth, the sessionless report 510 may indicate an overall severity level.

Sixth, the sessionless report 510 may contain a Correlation Tag, which is a string value that is generated by the DM Client 500 and is guaranteed to be unique within the DM Client 500. At some later time, when a DM Session 520 is established between the DM Server 502 and the DM Client 500, the Correlation Tag may be included in a message that is sent from the DM Server 502 to the DM Client 500. This is taken as an implicit acknowledgement 530 by the DM Client 500 that the sessionless report 510 was successfully processed by the DM Server 502.

Sessionless Report Configuration Management Object (MO)

In one exemplary embodiment, a new MO may be defined that includes a parent node and leaf nodes pertaining to buffering and retry behavior of a DM Client for sessionless report messages. For convenience in explanation, the new MO is referred to herein as a Sessionless Report Configuration MO. However, the specific MO name (e.g., Sessionless Report Configuration MO) is merely illustrative; it is the function of the respective MO that corresponds to exemplary embodiments of the present invention.

The Sessionless Report Configuration MO according to an exemplary embodiment of the present invention is described below with reference to FIG. 6.

Figure 6:
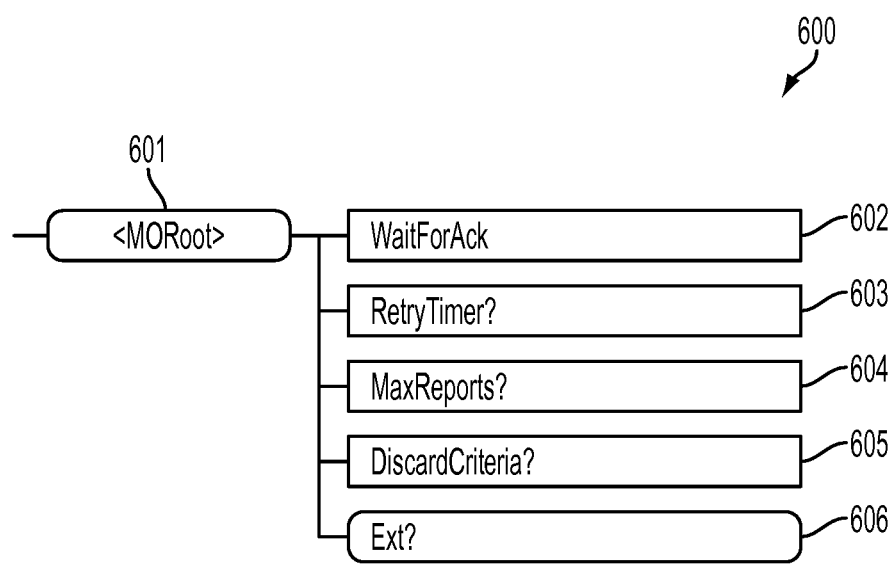
FIG. 6 illustrates a Sessionless Report Configuration MO node tree according to an exemplary embodiment of the present invention.

FIG. 6 illustrates a Sessionless Report Configuration MO node tree according to an exemplary embodiment of the present invention.

Referring to FIG. 6, the Sessionless Report Configuration MO 600 tree includes one or more new nodes for sessionless reporting. The Sessionless Report Configuration MO 600 may be added to the Management Tree in any of various locations. Also, one or more MOs may provide references to pertinent instances of the Sessionless Report Configuration MO 600.

The one or more new nodes for sessionless reporting may include a MO Root (MORoot) node 601, a Wait For Acknowledgement (WaitForAck) node 602, a Retry Timer (RetryTimer) node 603, a Maximum Reports (MaxReports) node 604, a Discard Criteria (DiscardCriteria) node 605, and an Extension (Ext) node 606. The specific node names (e.g., MORoot, WaitForAck, RetryTimer, MaxReports, DiscardCriteria, and Ext) are merely illustrative; it is the function of the respective node that corresponds to exemplary embodiments of the present invention.

The MORoot node 601 is a placeholder node that is the root node for the Sessionless Report Configuration MO 600. In particular, the MORoot node 601 is a parent node for all leaf nodes pertaining to sessionless reporting, including each of the WaitForAck node 602, RetryTimer node 603, MaxReports node 604, and DiscardCriteria node 605; and Ext node 606. The parent node of MORoot node 601 defines the location of the Sessionless Report Configuration MO 600 in the Management Tree. The MORoot node 601 may include the properties shown in Table 1.

TABLE 1A

| Status | Occurrence | Format | Minimum Access Types |
|---|---|---|---|
| Required | One | Node | Get |

Alternatively, the MORoot node 601 may include the properties shown in Table 1B.

TABLE 1B

| Status | Occurrence | Format | Minimum Access Types |
|---|---|---|---|
| Optional | ZeroOrOne | Node | Get |

The WaitForAck node 602 is leaf node that indicates whether or not the DM Client should buffer the report message until the DM Client receives a message from the DM Server, in a subsequent DM session with the DM Server, which contains the original Correlation Tag. Acknowledgement of the original Correlation Tag implies that the DM Server received the original sessionless report. If the value of this node is false, the DM Client does not maintain any state information pertaining to the sessionless report. Herein, it is noted that the WaitForAck node 602 may be omitted from the Sessionless Report Configuration MO 600 and that another mechanism may be relied upon to address whether or not the DM Client should buffer the report message until the DM Client receives an acknowledgement from the DM Server.

The WaitForAck node 602 is located in the Sessionless Report Configuration MO 600 at Node: <MORoot>/WaitForAck. The WaitForAck node 602 may include the properties shown in Table 2.

TABLE 2

| Status | Occurrence | Format | Minimum Access Types |
|---|---|---|---|
| Required | One | Boolean | Get, Replace |

The RetryTimer node 603 is a leaf node that indicates the time duration, in seconds, for which the DM Client should wait for the delayed acknowledgement of the sessionless report from the DM Server. The delayed acknowledgement may be a message that includes the original Correlation Tag. If the DM Client does not receive the acknowledgement within the specified time, it resends corresponding sessionless report. If this node is not present, the DM Client will wait indefinitely for the delayed acknowledgement from the DM Server. If the WaitForAck node 602 is implemented and the value of the WaitForAck node 602 is false, the RetryTimer node 603 should not be present. The RetryTimer node 603 is located in the Sessionless Report Configuration MO 600 at Node: <MORoot>/RetryTimer. The RetryTimer node 603 may include the properties shown in Table 3A.

TABLE 3A

| Status | Occurrence | Format | Minimum Access Types |
|---|---|---|---|
| Required | ZeroOrOne | Integer | Get, Replace |

Alternatively, RetryTimer node 603 may include the properties shown in Table 3B.

TABLE 3B

| Status | Occurrence | Format | Minimum Access Types |
|---|---|---|---|
| Optional | ZeroOrOne | Integer | Get, Replace |

The MaxReports node 604 is a leaf node that indicates a threshold corresponding to the maximum number of sessionless reports that can be buffered by the DM Client, while awaiting acknowledgement from the DM Server in subsequent DM Session(s). Once the number of sessionless reports that are buffered by the DM Client reaches this threshold, the DM Client should start discarding the older reports. The MaxReports node 604 is located in the Sessionless Report Configuration MO 600 at Node: <MORoot>/MaxReports. The MaxReports node 604 may include the properties shown in Table 4.

TABLE 4

| Status | Occurrence | Format | Minimum Access Types |
|---|---|---|---|
| Required | ZeroOrOne | Integer | Get, Replace |

The DiscardCriteria node 605 is a leaf node that indicates the criteria for discarding sessionless reports that have not been acknowledged by the DM Server in a subsequent DM Session when the MaxReports threshold is reached. The permitted values of the DiscardCriteria node 605 are shown in Table 5.

TABLE 5

| | |
|---|---|
| 0 | The DM Client should only discard sessionless reports in chronological order (i.e., the oldest sessionless report is the first sessionless report discarded, and so on). |
| 1 | The DM Client should discard sessionless reports based on the severity level of the report, with least severe reports being discarded before more severe reports. For example, the order of deletion, in deceasing order of preference, may be: Indeterminate, Harmless, Informational, Warning, Minor, Critical, and Fatal. Within the same severity level, sessionless reports should be discarded in chronological order (i.e., the oldest sessionless report within the same severity level is the first sessionless report discarded, and so on). |

If the DiscardCriteria node 605 is absent, its value may default to 0. The DiscardCriteria node 606 is located in the Sessionless Report Configuration MO 600 at Node: <MORoot>/DiscardCriteria. The DiscardCriteria node 605 may include the properties shown in Table 6.

TABLE 6

| Status | Occurrence | Format | Minimum Access Types |
|---|---|---|---|
| Required | ZeroOrOne | Integer | Get, Replace |

The Ext node 606 is an interior node that is for vendor-specific extensions to the Sessionless Report Configuration MO 600. The Ext node 606 is located at Node: <MORoot>/Ext. The Ext node 606 may include the properties shown in Table 7.

TABLE 7

| Status | Occurrence | Format | Minimum Access Types |
|---|---|---|---|
| Optional | ZeroOrOne | Node | Get |

A structure of a device including a DM Client according to an exemplary embodiment of the present invention will be described below with reference to FIG. 7.

Figure 7:
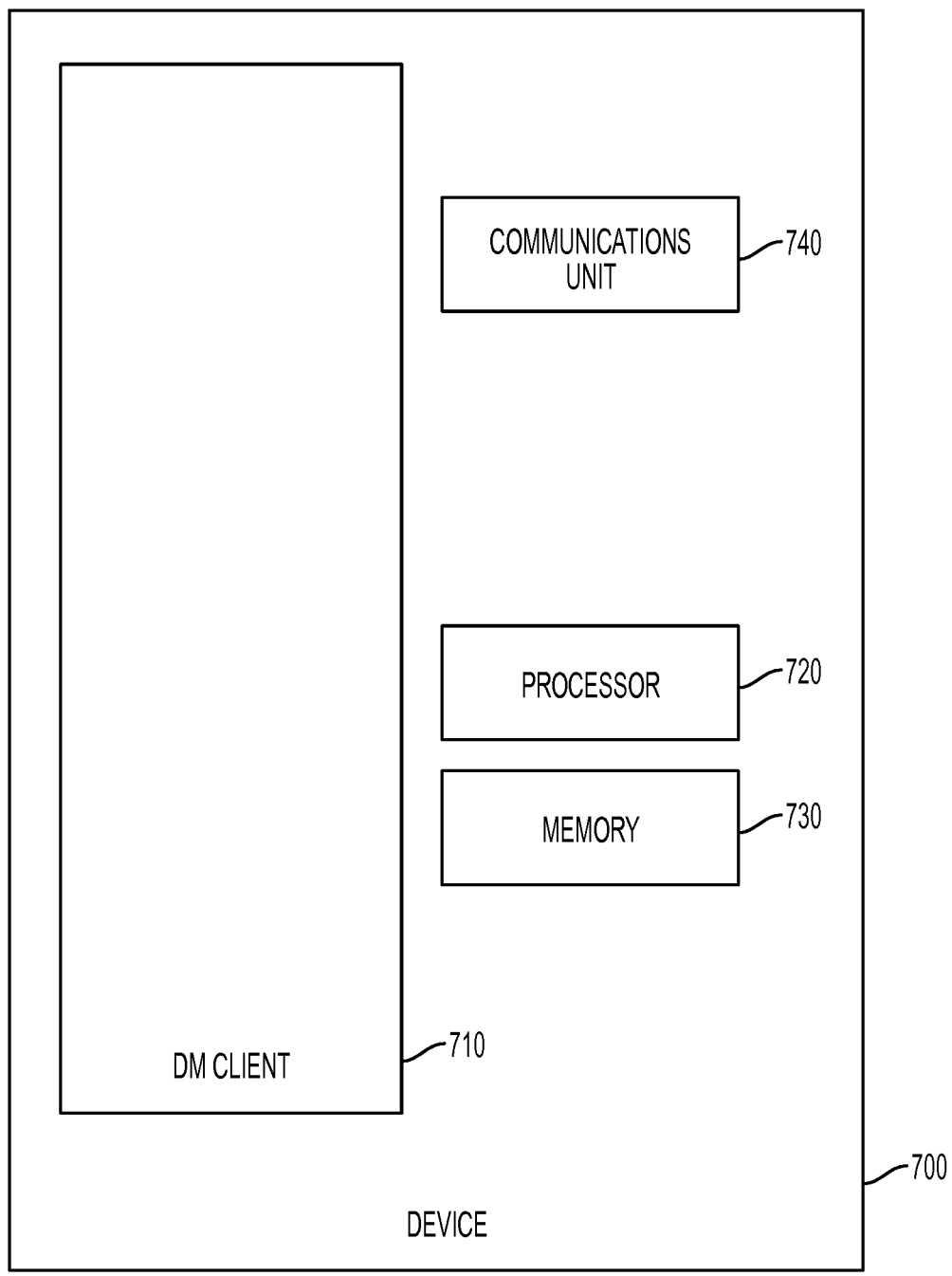
FIG. 7 is a block diagram of a device including a DM Client according to an exemplary embodiment of the present invention.

FIG. 7 is a block diagram of a device including a DM Client according to an exemplary embodiment of the present invention.

Referring to FIG. 7, the device 700 includes a DM Client 710, a processor 720, a memory 730, and a communications unit 740. The device 700 may include any number of additional structural elements. However, a description of additional structural elements of device 700 is omitted for conciseness.

The DM Client 710 may be implemented as code that is executed by the processor 720 or may be implemented as hardware. The term "code" may be used herein to represent one or more of executable instructions, operand data, configuration parameters, and other information stored in memory 730 of the device 700. The operations of the DM Client 710 include any of the operations explicitly or implicitly described above as being performed by a DM Client.

The processor 720 is used to process general operations of the device 700 and may be used to execute the code of the DM Client 710.

The memory 730 may store the code of the DM Client 710 in addition to one or more of executable instructions, operand data, configuration parameters, and other information stored of the device 700. Depending on the exact configuration and type of device, the memory 730 may be volatile (such as Random Access Memory (RAM)), non-volatile (such as Read Only Memory (ROM), flash memory, etc.) or some combination of thereof.

The communications unit 740 sends and receives data between the DM Client 710 and other entities, such as a DM server, etc. The communications unit 740 may include any number of transceivers, receivers, and transmitters of any number of types, such as wired, wireless, etc.

A structure of a DM Server according to an exemplary embodiment of the present invention will be described below with reference to FIG. 8.

Figure 8:
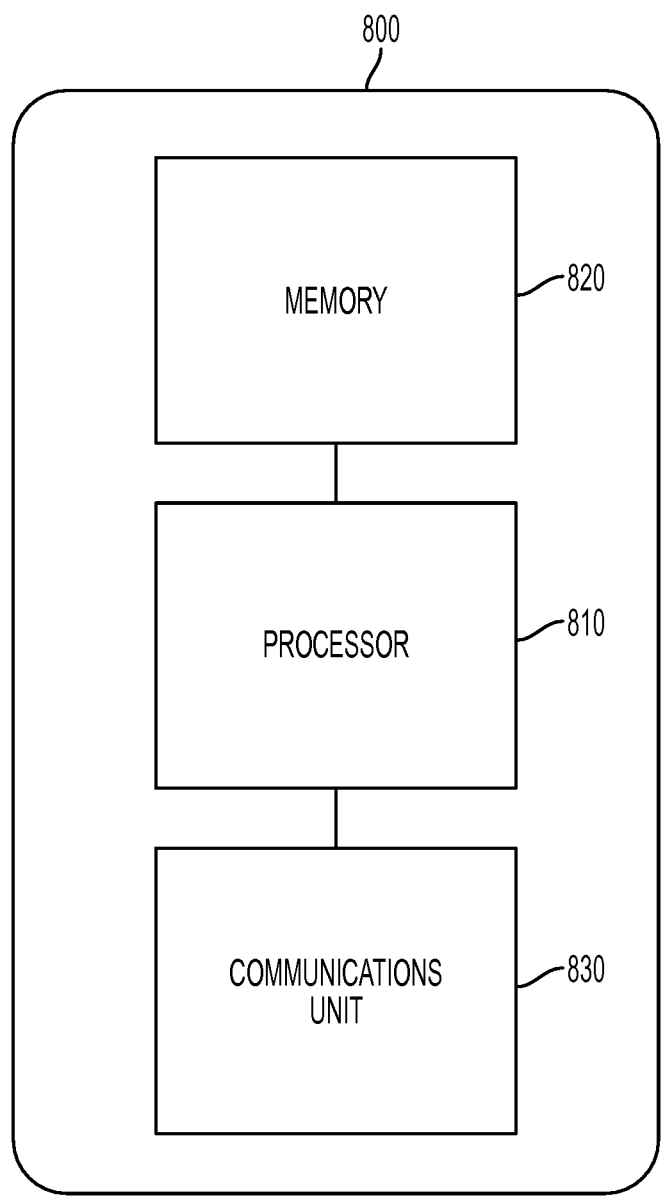
FIG. 8 is a block diagram of a DM Server according to an exemplary embodiment of the present invention.

FIG. 8 is a block diagram of a DM Server according to an exemplary embodiment of the present invention.

Referring to FIG. 8, the DM Server 800 includes a processor 810, a memory 820, and a communications unit 830. The DM Server 800 may include any number of additional structural elements. However, a description of additional structural elements of the DM Server 800 is omitted for conciseness.

The processor 810 is used to process general operations of the DM Server 800 and may be used to execute code to perform any of the functions/operations/algorithms/roles explicitly or implicitly described herein as being performed by a DM Server. Further, the processor 810 may communicate with and/or control the memory 820 and/or the communications unit 830. The term "code" may be used herein to represent one or more of executable instructions, operand data, configuration parameters, and other information stored in memory 820.

The memory 820 may store code that is processed by the processor 810 to execute any of the functions/operations/algorithms/roles explicitly or implicitly described herein as being performed by a DM Server. In addition, one or more of other executable instructions, operand data, configuration parameters, and other information may be stored in the memory 820. Depending on the exact configuration of the DM Server 800, the memory 820 may be volatile (such as Random Access Memory (RAM)), non-volatile (e.g., Read Only Memory (ROM), flash memory, etc.) or some combination thereof.

The communications unit 830 transmits and receives data between one or more of a DM device and other entities. The communications unit 830 may include any number of transceivers, receivers, and transmitters of any number of types, such as wired, wireless, etc.

At this point it should be noted that the exemplary embodiments of the present disclosure as described above typically involve the processing of input data and the generation of output data to some extent. This input data processing and output data generation may be implemented in hardware, or software in combination with hardware. For example, specific electronic components may be employed in a mobile device or similar or related circuitry for implementing the functions associated with the exemplary embodiments of the present invention as described above. Alternatively, one or more processors operating in accordance with stored instructions (i.e., code) may implement the functions associated with the exemplary embodiments of the present invention as described above. If such is the case, it is within the scope of the present disclosure that such instructions may be stored on one or more non-transitory processor readable mediums. Examples of the non-transitory processor readable mediums include ROM, RAM, Compact Disc (CD)-ROMs, magnetic tapes, floppy disks, and optical data storage devices. The non-transitory processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A device for performing sessionless reporting, the device comprising:
    a memory for storing code of a Device Management (DM) Client and a Sessionless Report Configuration Management Object (MO), the Sessionless Report Configuration MO comprising a data structure including one or more nodes;
    a processor for executing the code of the DM Client stored in the memory;
    a transceiver for sending and receiving information for the DM Client; and
    the DM Client for sending one or more sessionless reports, each using DM protocol, to a DM server with which the DM Client does not have an established DM session, and, while awaiting acknowledgement of the one or more sessionless reports from the DM Server in a subsequent DM Session, for controlling sessionless reporting based on criteria specified in at least one node included in the Sessionless Report Configuration MO,
    wherein the sessionless reports are not comprised in an establishment of a DM session and comprise at least one of a report using a Session Alert Code other than a code indicating Server Initiated Management and a code indicating Client Initiated Management, a report not containing Device Information (Devinfo) data, a report comprising status blocks containing both a Session Identifier (ID) and a Command ID, a report comprising a timestamp value indicating a time at which the sessionless report was issued, a report indicating an overall severity level, and a report containing a Correlation Tag comprising a string value generated by the DM Client and guaranteed to be unique within the DM Client.

2. The device of claim 1, wherein the at least one node comprises a RetryTimer node that indicates a time duration for which the DM Client waits for the acknowledgement of the one or more sessionless reports from the DM Server in the subsequent DM Session, and
    wherein, if the DM Client does not receive acknowledgement of at least one sessionless report from the DM Server in the subsequent DM Session within the time duration, the DM Client resends the at least one sessionless report to the DM Server.

3. The device of claim 2, wherein the time duration is indicated in seconds.

4. The device of claim 1, wherein the DM Client buffers the one or more sessionless reports while awaiting acknowledgement of the one or more sessionless reports from the DM Server in the subsequent DM Session,
    wherein the at least one node comprises a MaxReports node that indicates a threshold corresponding to a maximum number of sessionless reports that can be buffered by the DM Client, while awaiting the acknowledgement of the one or more sessionless reports from the DM Server in the subsequent DM Session, and
    wherein, if the number of the one or more sessionless reports that are buffered by the DM Client reaches the threshold, the DM Client discards at least one sessionless report.

5. The device of claim 4, wherein the at least one node comprises a DiscardCriteria node that indicates criteria for discarding the at least one sessionless report when the MaxReports threshold is reached.

6. The device of claim 5, wherein the criteria for discarding the at least one sessionless report includes an indication to discard the at least one sessionless report in a chronological order such that the oldest sessionless report is discarded first.

7. The device of claim 5, wherein the criteria for discarding the at least one sessionless report includes an indication to discard the at least one sessionless report based on a severity level of the one or more sessionless reports, with a least severe sessionless report is discarded before more severe sessionless report.

8. The device of claim 7, wherein the criteria for discarding the at least one sessionless report among sessionless reports of the same severity level includes an indication to discard the sessionless reports of the same severity level in a chronological order such that the oldest sessionless report of the same severity level is discarded first.

9. A method for a Device Management (DM) Client to perform sessionless reporting, the method comprising:
sending one or more sessionless reports, each using DM protocol, to a DM server with which the DM Client does not have an established DM session;
while awaiting acknowledgement of the one or more sessionless reports from the DM Server in a subsequent DM Session, controlling sessionless reporting based on criteria specified in a data structure comprising at least one node included in a Sessionless Report Configuration Management Object (MO),
wherein the sessionless reports are not comprised in an establishment of a DM session and comprise at least one of a report using a Session Alert Code other than a code indicating Server Initiated Management and a code indicating Client Initiated Management, a report not containing Device Information (Devinfo) data, a report comprising status blocks containing both a Session Identifier (ID) and a Command ID, a report comprising a timestamp value indicating a time at which the sessionless report was issued, a report indicating an overall severity level, and a report containing a Correlation Tag comprising a string value generated by the DM Client and guaranteed to be unique within the DM Client.

10. The method of claim 9, wherein the at least one node comprises a RetryTimer node that indicates a time duration for which the DM Client waits for the acknowledgement of the one or more sessionless reports from the DM Server in the subsequent DM Session, and
wherein, if acknowledgement of at least one sessionless report is not received from the DM Server in the subsequent DM Session within the time duration, resending the at least one sessionless report to the DM Server.

11. The method of claim 10, wherein the time duration is indicated in seconds.

12. The method of claim 9, further comprising:
buffering the one or more sessionless reports while awaiting acknowledgement of the one or more sessionless reports from the DM Server in the subsequent DM Session,
wherein the at least one node comprises a MaxReports node that indicates a threshold corresponding to a maximum number of sessionless reports that can be buffered by the DM Client, while awaiting the acknowledgement of the one or more sessionless reports from the DM Server in the subsequent DM Session, and
wherein, if the number of the one or more sessionless reports that are buffered by the DM Client reaches the threshold, at least one sessionless report is discarded.

13. The method of claim 12, wherein the at least one node comprises a DiscardCriteria node that indicates criteria for discarding the at least one sessionless report when the MaxReports threshold is reached, and
wherein the at least one sessionless report is discarded based on the criteria when the MaxReports threshold is reached.

14. The method of claim 13, wherein the criteria for discarding the at least one sessionless report includes an indication to discard the at least one sessionless report in a chronological order such that the oldest sessionless report is discarded first.

15. The method of claim 13, wherein the criteria for discarding the at least one sessionless report includes an indication to discard the at least one sessionless report based on a severity level of the one or more sessionless reports, with a least severe sessionless report is discarded before more severe sessionless report.

16. The method of claim 15, wherein the criteria for discarding the at least one sessionless report among sessionless reports of the same severity level includes an indication to discard the sessionless reports of the same severity level in a chronological order such that the oldest sessionless report of the same severity level is discarded first.

17. At least one non-transitory processor readable medium storing a computer program of instructions configured to be readable by at least one processor for instructing the at least one processor to execute a computer process for performing a method for a Device Management (DM) Client to perform sessionless reporting, the method comprising:
sending one or more sessionless reports, each using DM protocol, to a DM server with which the DM Client does not have an established DM session;
while awaiting acknowledgement of the one or more sessionless reports from the DM Server in a subsequent DM Session, controlling sessionless reporting based on criteria specified in a data structure comprising at least one node included in a Sessionless Report Configuration Management Object (MO),
wherein the sessionless reports are not comprised in an establishment of a DM session and comprise at least one of a report using a Session Alert Code other than a code indicating Server Initiated Management and a code indicating Client Initiated Management, a report not containing Device Information (Devinfo) data, a report comprising status blocks containing both a Session Identifier (ID) and a Command ID, a report comprising a timestamp value indicating a time at which the sessionless report was issued, a report indicating an overall severity level, and a report containing a Correlation Tag comprising a string value generated by the DM Client and guaranteed to be unique within the DM Client.

* * * * *